C. J. CRONANDER.
ROD BENDING MACHINE.
APPLICATION FILED FEB. 11, 1911.

1,050,348.

Patented Jan. 14, 1913.
5 SHEETS—SHEET 1.

Witnesses

Inventor
Carl J. Cronander
By his Attorney
P. T. Dodge

C. J. CRONANDER.
ROD BENDING MACHINE.
APPLICATION FILED FEB. 11, 1911.

1,050,348.

Patented Jan. 14, 1913.
5 SHEETS—SHEET 2.

Witnesses

Inventor
Carl J Cronander
By his Attorney
P. T. Dodge

C. J. CRONANDER.
ROD BENDING MACHINE.
APPLICATION FILED FEB. 11, 1911.
1,050,348.
Patented Jan. 14, 1913.
5 SHEETS—SHEET 3.
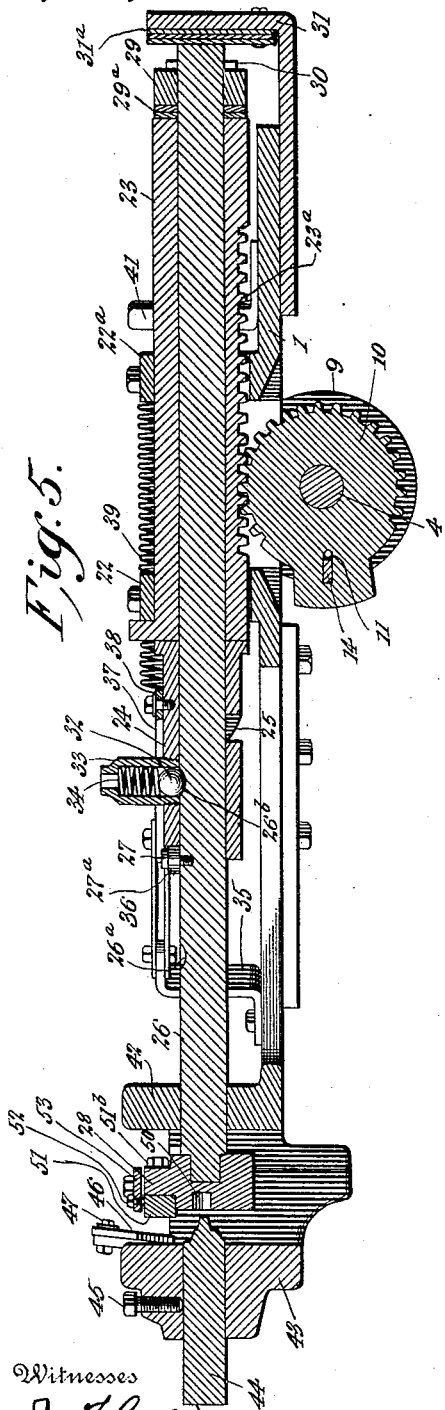

C. J. CRONANDER.
ROD BENDING MACHINE.
APPLICATION FILED FEB. 11, 1911.

1,050,348.

Patented Jan. 14, 1913.

5 SHEETS—SHEET 4.

Witnesses
Inventor
Carl J. Cronander
By his Attorney
P. T. Dodge

C. J. CRONANDER.
ROD BENDING MACHINE.
APPLICATION FILED FEB. 11, 1911.

1,050,348.

Patented Jan. 14, 1913.

5 SHEETS—SHEET 5.

Witnesses

Inventor
Carl J. Cronander
By his Attorney
P. T. Dodge

UNITED STATES PATENT OFFICE.

CARL J. CRONANDER, OF MOLINE, ILLINOIS, ASSIGNOR TO MOLINE PLOW COMPANY, A CORPORATION OF ILLINOIS.

ROD-BENDING MACHINE.

1,050,348.   Specification of Letters Patent.   Patented Jan. 14, 1913.

Application filed February 11, 1911. Serial No. 608,148.

*To all whom it may concern:*

Be it known that I, CARL J. CRONANDER, a citizen of the United States, and a resident of Moline, county of Rock Island, and State of Illinois, have invented a new and useful Improvement in Rod-Bending Machines, of which the following is a specification.

This invention relates to metal bending machines and is adapted, particularly, for forming eye-rods of the character commonly employed in agricultural implements, and the like.

The invention comprises, generally speaking, a suitable support adapted to sustain a power device which actuates a reciprocating member within which is supported a bender-carrying element, the position of which, relative to a rod-supporting block, is controlled by the position and movement of said reciprocating member. In this instance, the bender-carrying element moves longitudinally with the said reciprocating member and, then, at a predetermined position, is rotated, whereby the rod is bent or twisted around an arbor carried by the rod-supporting block.

The invention comprises, further, mechanism for controlling the movements of said reciprocating member and adjunctive parts.

The invention further comprises mechanism for controlling the positioning and actuation of the operating parts, whereby said reciprocating member is intermittently actuated to position the bender-carrying element relatively to the rod-supporting block.

The invention further comprises the novel arrangement and aggroupment of parts, all as hereinafter more particularly described and claimed.

Figure 1:
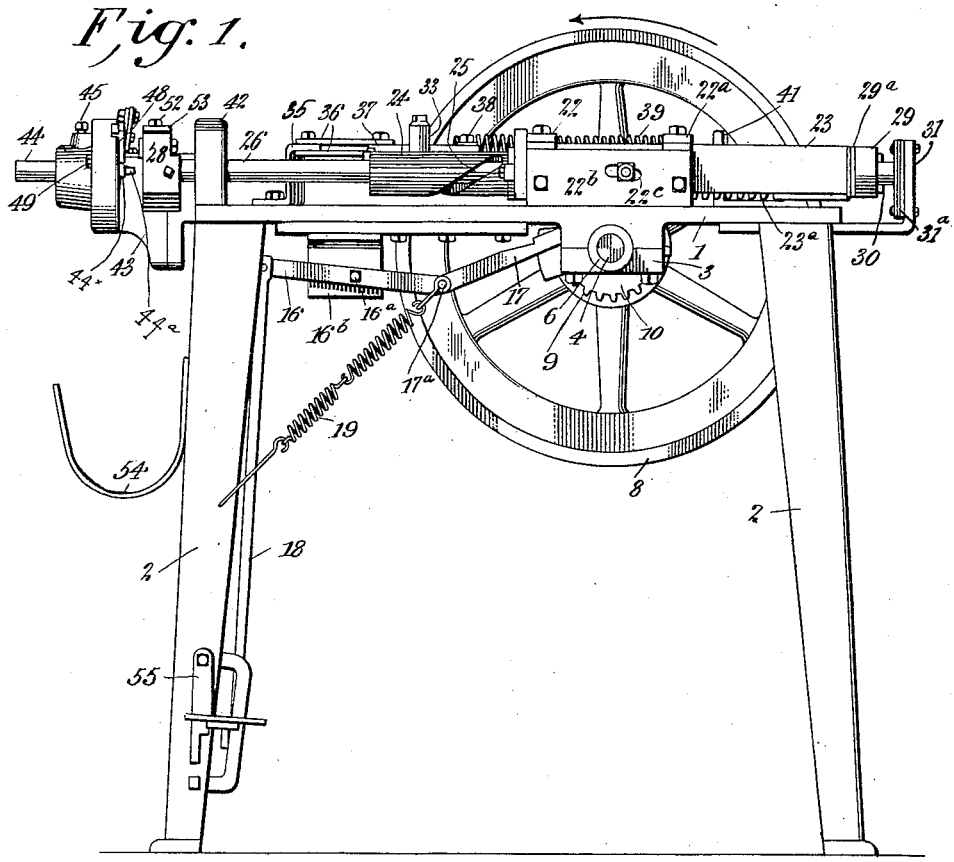
Figure 2:
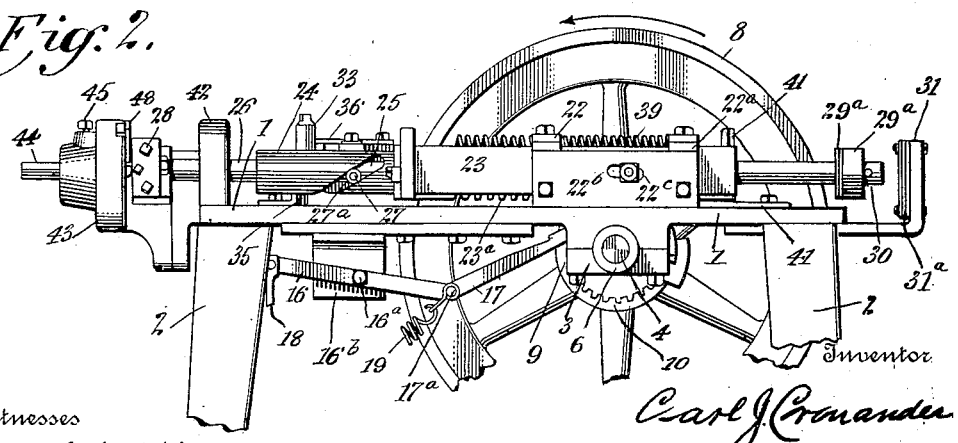
Figure 3:
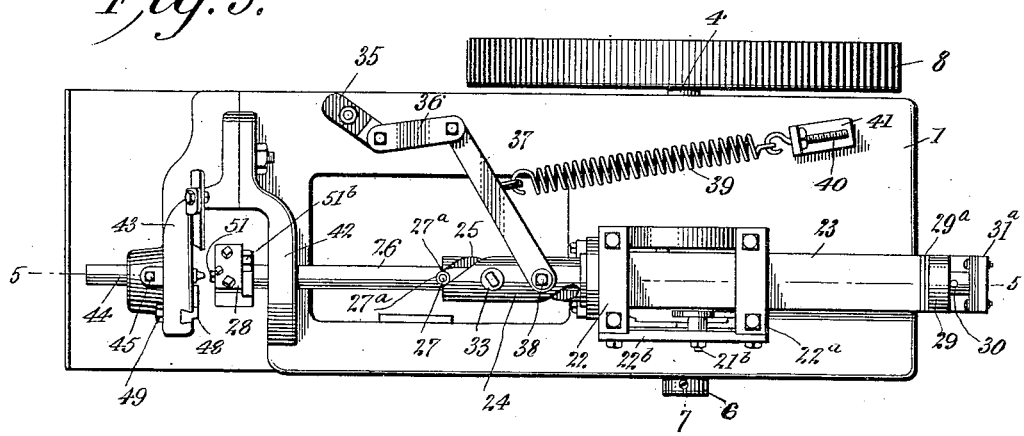
Figure 4:
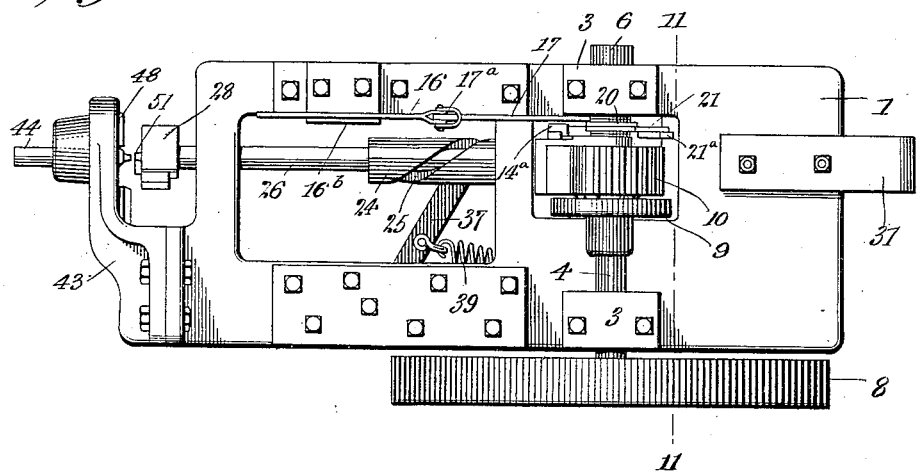
Figure 9:
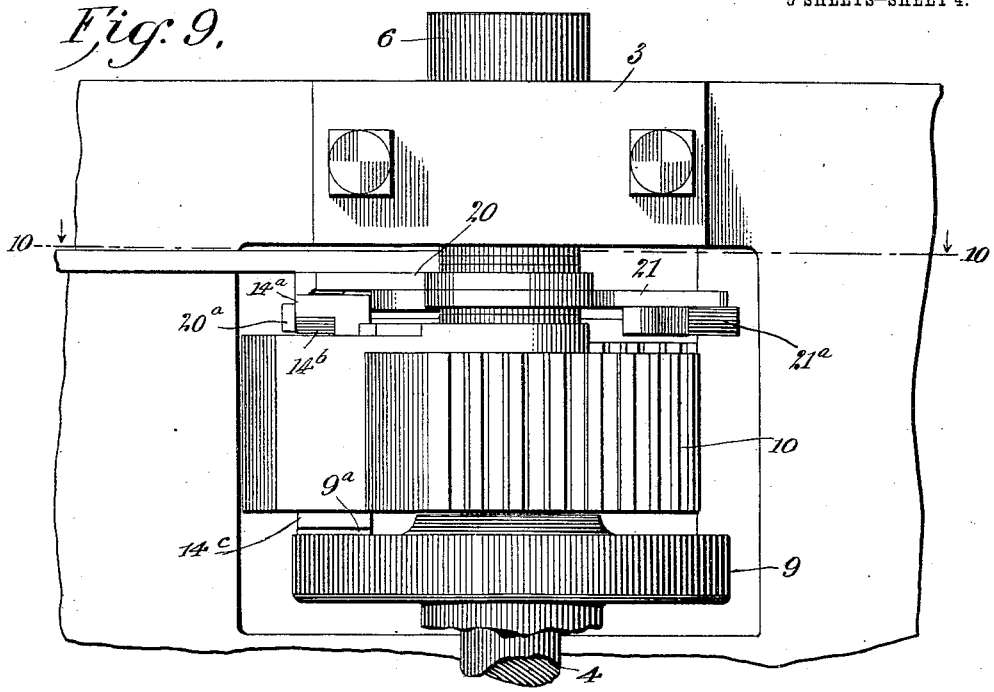
Figure 10:
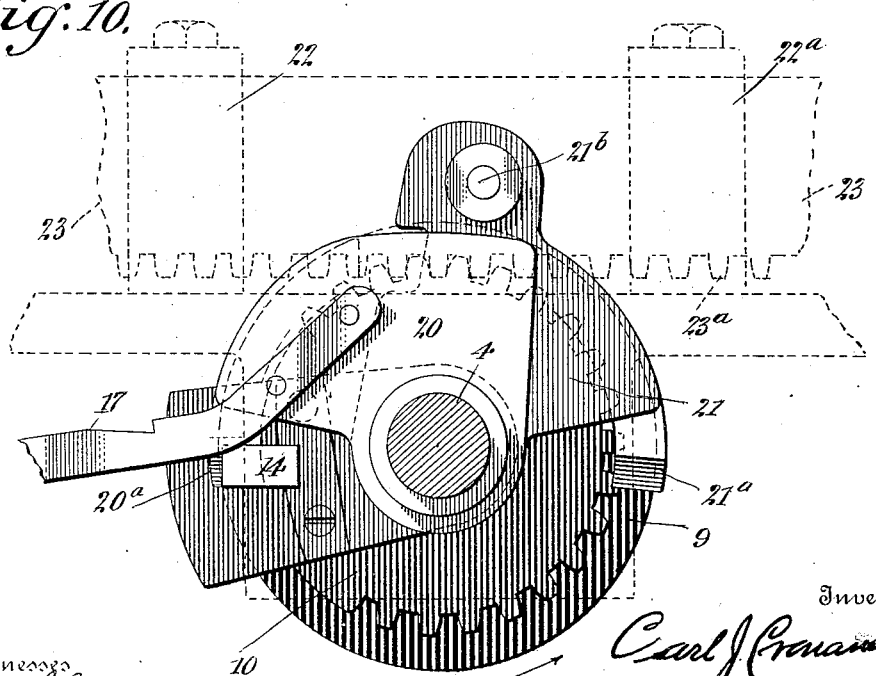
Figure 11:
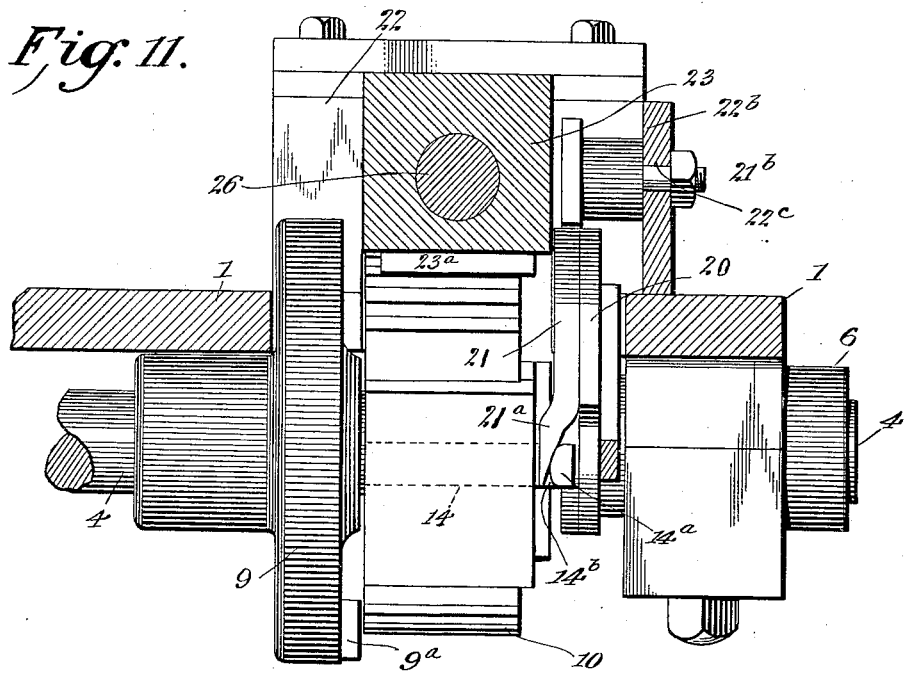
Figure 12:
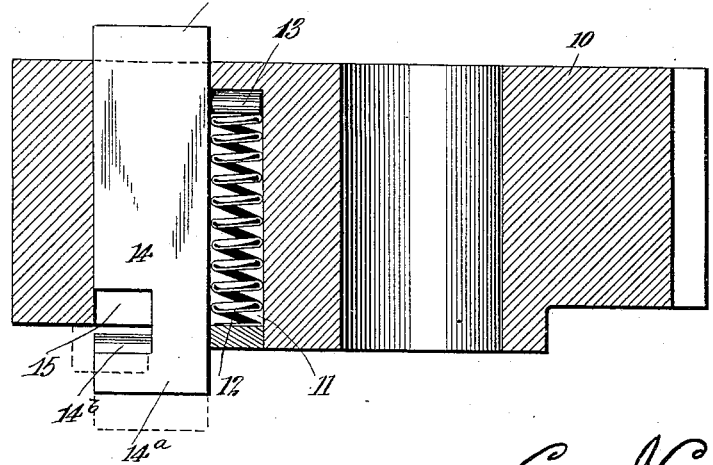

In the accompanying drawings, Figure 1 is a side elevation of an eye-rod bending machine embodying my invention, the parts being shown in their initial or starting position; Fig. 2 is a similar view illustrating the parts in the position they occupy at the completion of the bending operation but just before the spindle and its operating parts are returned to the starting position; Fig. 3 is a top plan view of the machine; Fig. 4 is a bottom plan view of the same; Fig. 5 is a longitudinal vertical section on the line 5—5, Fig. 3; Figs. 6, 7 and 8 are fragmentary views of the rod-supporting block, and of the rod-bending elements carried thereby and by the bending-die, and illustrating the successive positions of the parts in gaging the rod, bending the same, and completing the loop or eye; Fig. 9 is an enlarged, bottom plan view of the segmental gear, the clutch device, and the mechanism for effecting engagement and disengagement of the clutch and segmental gear; Fig. 10 is a fragmentary view, in sectional elevation, the section being taken on the line 10—10, Fig. 9, looking in the direction of the arrow; Fig. 11 is a sectional elevation of the machine, the section being taken on the line 11—11, Fig. 4; and Fig. 12 is a detached vertical section of the segmental gear, showing, particularly, the spring-actuated clutch pin.

In these drawings: the numeral 1 designates a bed-plate supported on legs or standards 2, these parts constituting the frame of the machine.

Journaled in suitable bearings 3, 3, on the underside of the bed-plate is a shaft 4, which carries, at one end, a collar 6 adjustably secured thereon by a set screw 7 (Fig. 3). At the opposite end, the axle carries a drivewheel 8 adapted to rotate constantly in the direction indicated by the arrows in Figs. 1 and 2 and driven by any suitable means.

Fast to the shaft 4 and intermediate of the drive-wheel and collar, is a clutch disk 9. Arranged in juxtaposition to this disk, and loosely carried on the axle, is a segmental gear 10, provided with a slot 11 in which is housed a spring 12 adapted to bear, at one end, against a projection or lug 13 carried by a clutch pin 14 which slides in an open-ended slot 15 extending through the segmental gear parallel to the axis thereof. The clutch pin is provided, at one end, with an L-shaped extension 14$^a$ formed with a cammed surface 14$^b$, whereby the engagement therewith of parts hereinafter described is facilitated.

Loosely carried by the shaft 4 are two juxtaposed disks 20 and 21. The disk 21 is normally stationary, and disk 20, loosely carried by the shaft 4, is adapted to have a limited rotative movement around the shaft 4, such movement being controlled by a treadle device 18, which is connected to the disk 20 by means of links 16 and 17. The link 16 is fulcrumed at 16$^a$ to a depending portion 16$^b$ of the bed-plate. A spring 19 for effecting the rotative movement of the disk 20 is connected at one end to the standards or legs 2 and at its opposite end to the links 16 and 17 at their point of juncture 17$^a$. The disks are disposed in a plane parallel with the side of the segmental gear and are offset to provide cammed extensions 20$^a$ on disk 20 and 21$^a$ on disk 21 (Figs. 10 and 11) disposed in the path of the L-shaped portion of the clutch pin 14. It will be understood that, when the treadle 18 is depressed by the operator, the link mechanism is thereby operated to effect a rotative movement of the disk 20 upwardly and thereby shift the extension 20$^a$ out of engagement with the L-shaped portion of the clutch pin 14, which permits this pin 14 to be actuated, under the action of the spring 12, so that its engaging end 14$^c$ will be positioned in the path of a lug 9$^a$, carried by the clutch disk 9 (Fig. 11). Thereby, the segmental gear and clutch disk 9 are engaged to effect a rotative movement of the gear. When the gear, with the connected clutch disk 9 has reached a position in its rotative movement diametrically opposite that at which an engagement of the disk and gear was effected, the clutch pin 14 engages the offset cammed portion 21$^a$ of the disk 21, whereby the clutch pin is shifted and disconnected from engagement with the lug 9$^a$, permitting the free rotative movement of the clutch disk 9.

Mounted upon the upper face of the bed-plate are two inverted U-shaped guides 22 and 22$^a$ connected by a longitudinal strip 22$^b$, in which an elongated reciprocating member 23 or sleeve is adapted to be slidably supported. This member is provided at one end with a sleeve 24 fixed thereto, and is provided also with a spiral groove 25.

Movably supported within the reciprocating member 23 and the grooved sleeve 24 is a spindle 26 provided with an upstanding pin 27 carrying a roller 27$^a$ adapted to move in the spiral groove 25 in the sleeve 24. By this means, the spindle is given a rotative movement, as will presently be more fully explained. The reciprocating member 23 is provided, on its under face, with a rack 23$^a$, with which the segmental gear 10, already referred to, is adapted to engage. The spindle 26, at its forward end, carries a suitable bender-head 28. The opposite end of the spindle is provided with a collar 29 retained on the spindle by a pin 30, and is provided also with a buffer 29$^a$. This buffer is adapted to limit the rearward movement of the sleeve 23 and cushion the same when it returns to starting position.

The bed-plate is provided with a bracket 31 constituting a buffer 31$^a$ for the rear end of the spindle when it is returned to its starting position. The spindle is provided with sockets or recesses 26$^a$ and 26$^b$ adapted to receive a ball 32 housed within an upstanding member 33, the ball being controlled by a spring 34, also housed within said member. This device constitutes a means for intermittently connecting the reciprocating parts with the spindle, whereby the latter is caused to be actuated with the reciprocating parts.

Mounted on the upper face of the bed-plate 1 is a bracket 35, upon which is pivoted a link 36, and to this is jointed an arm 37 pivotally connected at 38 to the spirally-grooved sleeve 24. Connecting with the arm 37, at one end, is a spring 39 for returning the sleeve 24 to its original starting position after the bending action has been completed, which spring at its opposite end, is attached to an adjustable tension device 40 carried by a bracket 41 secured to the upper surface of the bed-plate. The spindle extends through a guiding bearing 42 upstanding from the bed-plate, at its forward end, and, beyond the bearing, carries the bender-head 28, already referred to.

A bracket 43 is mounted at the forward end of the bed plate and has adjustably mounted therein, by means of a set screw 45, a horizontal arbor 44, the inner end, 44$^x$, of which is cylindrical and projects inwardly beyond the face of the bracket, thereby constituting a mandrel or die, about which the stock is adapted to be bent, as will be presently described. Adjustably secured on the bracket 43 is a stock gage 46, retained in position by an adjusting screw 47. Mounted on the inside face of the bracket 43, and adapted to be adjusted thereon, is a rod-engaging member or block 48, forming the second element of the aforementioned bending device. This extends inwardly toward the arbor 44 and its lower end is curved, as shown in Figs. 6 to 8. The adjustment of the member 48 toward or away from the arbor is permitted by the provision of an adjusting bolt 49.

The bender-head 28 is provided with a central aperture 50, adapted when the head is moved up to the mandrel, to receive an eccentrically located centering pin, 44$^a$, on the end of the mandrel. The bender-head is also provided with an adjustable bender die or block 51, forming the third element of the aforementioned bending device. The rod-engaging end 51$^a$ of the member 51 is preferably curved to facilitate its sliding engagement as it bends the rod. The block 51 is retained by an adjusting screw 51$^b$. An additional retention thereof is effected by an adjusting screw 52, in a plate 53. The screw 52 is adapted to retain the block against outward displacement.

Operation: Assuming that the parts of the machine are in the position shown in Fig. 1, and that the proper length of rod has been inserted between the member 48 and the mandrel 44ˣ, and against the gage member 46, the operator, by means of the treadle mechanism 18, releases the clutch pin, in the manner already described, thus positioning it into the path of travel of the lug 9ᵃ carried by the clutch disk 9. Thereupon, the segmental gear is rotated a half-circle, during which movement it drives the sleeve 23 forward, and with it the spindle (temporarily locked therewith by means of the spring-pressed ball 32) until the bender-head reaches its limit of movement, which is determined by the seating of the centering pin 44ᵃ in the recess 50 in the bender-head. The continued movement of the sleeve 23 forces the ball 32 out of the recess 26ᵇ and along the surface of the spindle until it arrives at the recess 26ᵃ, into which it then becomes seated. In the interim, the roller 27ᵃ on the pin 27 is caused to travel in the spiral groove 25 and this effects a rotative movement of the spindle 26, and of the bender-head 28. By such rotative movement of the bender-head, the bender block 51 is engaged with the portion of the rod lying between the member 48 and the gage 46, as shown in Fig. 6, and bends the same, in its traveling movement, around the mandrel. When said bender block reaches the position shown in Fig. 7, the body portion of the rod is carried with it and into engagement with the bender block 48, whereby the loop is centered relatively to the body portion of the rod. By these operations, the loop or eye has been formed on the rod, as shown in Fig. 8. By the time the ball 32 reaches the socket 26ᵃ, the operations just described will have been performed. The seating of the ball in said socket 26ᵃ again effects an interlocking of the spirally-grooved sleeve with the spindle. The operation of the clutch mechanism, already described, is so timed that, when this latter interlocking of the sleeve with the spindle is effected, the L-shaped portion of the clutch pin will have engaged the offset portion 21ᵃ of the disk 21, whereupon the disk and gear are disconnected. This then permits the spring 39 to effect its function of returning the reciprocating member 23 to normal postion, and the sleeve, in turn, (by bing interlocked with the spindle 26) restores the same to its starting position. Thereupon, when the rear end of the spindle engages the buffer 31ᵃ, the spindle is held against further movement while the encircling sleeve continues its further rearward movement to unseat the ball 32 from the socket 26ᵃ and again position it in the recess 26ᵇ. The parts are then in their original position and ready to be thrust forward by the segmental gear, as already described. By means of the buffers 29ᵃ and 31ᵃ, jar and strain to the parts is eliminated when the spindle and sleeve engage the same. Thereafter, the operator is enabled to withdraw the completed eye-rod and he may then conveniently deposit it in the tray 54 suitably mounted on one of the legs 2.

As will be seen, the parts and mechanisms are intermittently operated. To provide for a continuous operation thereof, I have arranged means whereby the clutch pin may be controlled without necessity of the operator actuating the treadle to effect a starting of the parts. This result is attained by latching the treadle when in its depressed position by means of a latch 55 pivotally mounted at the lower end of one of the legs 2 of the frame of the machine. It will be understood that, by this means, the link mechanism is caused to hold the clutch pin against being moved out of the path of the lug 9ᵃ of the clutch disk 9, so that the clutch pin is only positioned out of the path of the collar 9ᵃ on the disk 9 at the end of its forward stroke. When it shall have returned to normal position, the continued rotation of the disk 9 will carry the pin past the offset portion 20ᵃ of the disk 20 without its engaging therewith. In other words, the continuous operation is effected by holding the treadle-actuated disk 20 out of operative engagement with the clutch pin 14. Thus, the clutch pin 14 engages only the offset portion 21ᵃ of the disk 21, which intermittently effects a disengagement of the clutch members to permit return of the reciprocating member 23, and connected parts, to starting position.

By reason of the adjustable mounting of certain of the parts, already referred to, I am enabled to adapt the device for forming eyes or loops upon rods of various sizes, to meet requirements. The gage plate 46 determines the amount of stock which is to be bent around the arbor to form the loop or eye. The size of the arbor of course determines the size of the eye or loop. This arbor therefore is interchangeable to enable the formation of various sizes of loops. When a different size arbor is placed in operative position, the bender blocks 48 and 51 may be adjusted in relation thereto to provide for the change in size of the loop or eye. Similarly, if the size of the work stock is changed, these members are adjusted to meet these conditions. To effect a change in the time of engagement of the offset portion 21ᵃ with the L-shaped extension of the clutch pin, the disk 21 is arranged for a slight adjustment. To this end, the longitudinal strip or plate 22ᵇ is provided with an arc-shaped slot 22ᶜ, through which the adjusting bolt 21ᵇ, carried by the disk 21, extends. The disk may, therefore, be adjusted concentrically, to the axis of the shaft 4, and this determines the time of engagement of the extension 21ᵃ with the clutch pin, as already referred to.

While I have herein described the details of my construction, it is nevertheless to be understood that I do not limit myself to such details, except in so far as the same are specified in the claim.

Having thus fully described my invention, its construction and mode of operation, what I claim as new and desire to secure by Letters Patent is:

1. In a bending machine, the combination of a work supporting die, a member traveling to and from the same, a bending die to coöperate with the work supporting die in bending the work supported by said member and movable longitudinally in relation thereto, and automatically acting means for interlocking said bending die and member in different longitudinal positions.

2. In a bending machine, a support, a reciprocating member sustained thereby, means for actuating said reciprocating member, including a segmental gear, a clutch device intermittently engaging therewith, means for actuating said clutch device, in combination with a bender device supported by and movable with said reciprocating member, and means for actuating said bender device relatively to said reciprocating member.

3. In a bending machine, a support, a reciprocating member sustained thereby, means for actuating said reciprocating member, including a segmental gear, a clutch device intermittently engaging therewith, means for actuating said clutch device, in combination with a bender device supported by and movable with said reciprocating member, and adjusting means for varying the actuation of said reciprocating member.

4. In a rod-bending machine, the combination of a support, a reciprocating member movably sustained thereby, a bender-operating element supported by said reciprocating member, and means for interlocking said element and reciprocating member comprising a ball adapted to lockingly engage said element, and means for actuating said reciprocating member.

5. In a rod-bending machine, the combination of a support, a movable member sustained thereby, a bender-operating device supported by and movable with said movable member, a power actuated device connecting with and adapted to actuate said reciprocating member, means for connecting said power actuated device with said reciprocating member, means for controlling the connection between said power device and the reciprocating member, whereby the latter may be given a continuous reciprocation, and means for intermittently actuating said bender device.

6. In a bending machine, the combination of a suitable supporting frame, a mandrel mounted thereon, means on the frame for positioning a rod with its end free, a bending device mounted on the frame and movable up to the rod to position said device relative to the free end of the rod, means for moving said bending device up to the rod, and means for rotating said bending device about its axis of movement to bend the rod laterally around the mandrel.

7. In a bending machine, the combination of a frame, a horizontally fixed mandrel about which the stock is adapted to be bent, a spindle mounted on the frame and slidable longitudinally to and from the mandrel, said spindle being rotatable about its longitudinal axis, a block on the end of the spindle adapted in the rotary movement of the spindle to engage and bend the stock around the mandrel, and means for imparting to the spindle, first, a longitudinal movement to position the bending block relative to the stock, and then a rotary motion to cause the block to bend the stock around the mandrel.

8. In a bending machine, the combination of a frame, a mandrel mounted thereon, and about which mandrel the stock is adapted to be bent, a spindle mounted on the frame, movable longitudinally to and from the mandrel, and rotatable about its longitudinal axis, said spindle being adapted to be arrested in its longitudinal movement, a block on the end of the spindle adapted by the movement of the spindle up to the mandrel to be positioned to one side of the mandrel, means for moving the spindle longitudinally to the mandrel, and means acting automatically when the longitudinal movement of the spindle is arrested to rotate the same to perform the bending operation.

9. In a bending machine, the combination of a frame, a mandrel thereon, a bending block sustained by the frame, said block being movable to and from the mandrel and being rotatable about its axis of movement, means for arresting the motion of the bending block toward the mandrel to position the block relative to the work, preparatory to performing the bending action, and means controlled by the arrest of the bending block for automatically rotating the same to perform the bending operation.

10. In a bending machine, the combination of a frame, a mandrel thereon, a sleeve slidable longitudinally toward and from the mandrel and provided with a spiral groove, a spindle slidingly mounted within the sleeve and having a pin extending in said groove, and having also means for bending the stock around the mandrel when the spindle is rotated, mechanism for moving the sleeve longitudinally toward the mandrel to advance the spindle, and means for arresting the advance of spindle; whereby the continued movement of the sleeve will act automatically to rotate the spindle and actuate the bending means.

11. In a bending machine, the combination of a frame, a mandrel thereon about which the stock is adapted to be bent, a head mounted on the frame and movable toward the mandrel and rotatable about its axis of movement, said head being provided with means for bending the stock around the mandrel when the head is rotated, means for moving the head toward the mandrel to position the bending means relative to the stock, and means acting automatically on the positioning of the parts, to rotate the bending head.

In testimony whereof I hereunto set my hand this eighth day of February, 1911, in the presence of two attesting witnesses.

CARL J. CRONANDER.

Witnesses:
L. C. BLANDING,
C. A. BANISTER.

---

Copies of this patent may be obtained for five cents each, by addressing the "Commissioner of Patents, Washington, D. C."